(12) United States Patent
Tagomori

(10) Patent No.: US 12,541,683 B2
(45) Date of Patent: Feb. 3, 2026

(54) INFORMATION PROCESSING APPARATUS FOR IMPROVING ROBUSTNESS OF DEEP NEURAL NETWORK BY USING ADVERSARIAL TRAINING AND FORMAL METHOD

(71) Applicant: NOMURA RESEARCH INSTITUTE, LTD., Tokyo (JP)

(72) Inventor: Teruhiro Tagomori, Irvine, CA (US)

(73) Assignee: Nomura Research Institute, Ltd., Tokyo (JP)

( * ) Notice: Subject to any disclaimer, the term of this patent is extended or adjusted under 35 U.S.C. 154(b) by 787 days.

(21) Appl. No.: 17/714,563

(22) Filed: Apr. 6, 2022

(65) Prior Publication Data

US 2023/0325651 A1 Oct. 12, 2023

(51) Int. Cl.
*G06N 3/08* (2023.01)
*G06F 18/21* (2023.01)
*G06F 18/40* (2023.01)

(52) U.S. Cl.
CPC ............. *G06N 3/08* (2013.01); *G06F 18/217* (2023.01); *G06F 18/40* (2023.01)

(58) Field of Classification Search
CPC ........ G06N 3/08; G06N 3/045; G06N 3/0464; G06N 3/094; G06N 3/09; G06N 3/084; G06N 3/0475; G06N 3/088; G06N 3/047; G06N 3/096; G06N 3/044; G06N 3/048; G06N 3/02; G06N 3/086; G06N 3/04; G06N 3/0455; G06N 3/063; G06N 3/126;

(Continued)

(56) References Cited

U.S. PATENT DOCUMENTS 10,616,257 B1 * 4/2020 Soulhi ................ H04L 63/1425
11,036,857 B2 * 6/2021 Tran ...................... G06N 3/045
(Continued)

FOREIGN PATENT DOCUMENTS

| CN | 107463951 A | 12/2017 |
|----|-------------|---------|
| CN | 113822328 A | 12/2021 |
| EP | 3798913 A1 | 3/2021 |

OTHER PUBLICATIONS

Zhang, et al., (Nov. 2, 2018) "Efficient Neural Network Robustness Certification with General Activation Functions," arXiv: 1811.00866v1 (Year: 2018).*

(Continued)

*Primary Examiner* — Luis A Sitiriche
(74) *Attorney, Agent, or Firm* — RANKIN, HILL & CLARK LLP

(57) ABSTRACT

An information processing apparatus acquires a user setting related to a feature of adversarial training and performs the adversarial training that trains a neural network by using training data including an adversarial sample and correct answer data indicating an original classification class, and the user setting, the adversarial training training the neural network that outputs a misclassification class in a case where the adversarial sample is input so as to output the original classification class in a case where the adversarial sample is input. The apparatus determines, by executing a format validation algorithm, that the adversarial sample does not exist within a predetermined range of noise of specific data in the neural network using a weighting factor obtained by the adversarial training.

3 Claims, 13 Drawing Sheets

DIFFERENCE BETWEEN BOUNDARY LINES ACCORDING TO PRESENCE OR ABSENCE OF ADVERSARIAL TRAINING

(58) Field of Classification Search
CPC ...... G06N 20/00; G06N 3/0895; G06N 5/046;
G06N 20/20; G06N 3/0495; G06N 3/082;
G06N 3/091; G06N 3/098; G06N 5/01;
G06N 5/02; G06N 7/01; G06N 7/046;
G06F 18/217; G06F 18/40
See application file for complete search history.

(56) References Cited

U.S. PATENT DOCUMENTS

| | | | |
|---|---|---|---|
| 2020/0082097 A1* | 3/2020 | Poliakov | G06F 21/577 |
| 2020/0234110 A1 | 7/2020 | Singh et al. | |
| 2021/0192354 A1* | 6/2021 | Patil | G06N 3/04 |
| 2021/0326751 A1* | 10/2021 | Liu | G06N 3/084 |
| 2022/0012815 A1* | 1/2022 | Kearney | G06N 20/20 |
| 2022/0100867 A1* | 3/2022 | Sinn | G06N 20/00 |
| 2022/0121991 A1* | 4/2022 | Kakizaki | G06N 3/084 |
| 2022/0300740 A1* | 9/2022 | Sahu | G06F 18/214 |
| 2022/0343214 A1* | 10/2022 | Kakizaki | G06V 40/172 |
| 2023/0047478 A1* | 2/2023 | Brito | G06N 3/084 |
| 2023/0274003 A1* | 8/2023 | Liu | G06N 3/094 |
| | | | 726/26 |

OTHER PUBLICATIONS

Madry et al., "Towards Deep Learning Models Resistant to Adversarial Attacks", ICLR, 2019, URL: https://arxiv.org/abs/1706.06083, total 28 pages.
Katz et al., "Towards Proving the Adversarial Robusstness of Deep Neural Networks", Stanford University, 2017, pp. 19-26.
Extended European Search Report (EESR) dated Dec. 5, 2022 for European Patent Application No. 22186000.0.

* cited by examiner

FIG. 12

| DATA ID | IMAGE DATA | CORRECT ANSWER LABEL (1: FAKE, 0: NORMAL) | DATA CLASSIFICATION | GENERATION ALGORITHM | NORM |
|---|---|---|---|---|---|
| DA001 | xxx1_ad.jpg | 1 | TRAINING DATA | FGSM | y |
| DA002 | xxx2_ad.jpg | 0 | TRAINING DATA | FGSM | x |
| DA003 | xxx3_ad.jpg | 1 | TEST DATA | FGSM | x |
| DA004 | xxx4_ad.jpg | 0 | TRAINING DATA | C&W Attack | y |
| ... | ... | ... | ... | ... | ... |

| MODEL ID | WEIGHTING FACTOR | HYPER PARAMETER | GENERATION DATE AND TIME | GENERATION STAGE (LABEL) |
|---|---|---|---|---|
| M001 | [[a1,a2,a3,...],[]... | x,y,z,... | YYYYMMDD1 | FORMAT VALIDATION PASS |
| M002 | [[b1,b2,b3,...],[]... | x,y,z,... | YYYYMMDD1 | ADVERSARIAL TRAINING IS COMPLETED |
| M003 | (NOT SET) | m,n,o,... | YYYYMMDD2 | ORIGINAL |
| M004 | [[d1,d2,d3,...],[]... | m,n,o,... | YYYYMMDD3 | FORMAT VALIDATION PASS |
| ... | ... | ... | ... | ... |

334

INFORMATION PROCESSING APPARATUS FOR IMPROVING ROBUSTNESS OF DEEP NEURAL NETWORK BY USING ADVERSARIAL TRAINING AND FORMAL METHOD

BACKGROUND OF THE INVENTION

1. Technical Field

The present invention relates to an information processing apparatus for improving robustness of a deep neural network by using adversarial training and a formal method.

2. Description of the Related Art

In recent years, it has become possible to recognize a subject included in an image with a high recognition probability by using a deep learning technique. There is known a technique of inputting an image called an adversarial sample, to which noise (perturbation) that is not noticed by humans is added, to a deep neural network for solving a classification problem such as subject recognition, and causing misclassification intentionally.

On the other hand, a technique called adversarial training has been developed, the technique of training a deep neural network so as to improve robustness against an attack causing misclassification in the deep neural network by using an adversarial sample (Aleksander Madry and four others, "Towards Deep Learning Models Resistant to Adversarial Attacks," ICLR 2018, Jun. 19, 2017, URL: https://arxiv.org/abs/1706.06083).

In the adversarial training, the deep neural network is trained using the adversarial sample as training data so as not to perform misclassification even when the adversarial sample is input. For this reason, the deep neural network generated by the adversarial training is not ensured to always output a correct classification result even when it becomes possible to obtain a high accuracy with a data sample used for training and testing, unlike learning of a general deep neural network.

On the other hand, since misclassification for the adversarial sample may cause a severe result, it is desirable to be able to predict how much robustness the trained neural network satisfy when performing the adversarial training.

SUMMARY OF THE INVENTION

The present invention has been made in view of the above problems, and an object of the present invention is to realize a technique of generating a deep neural network which is capable of being predicted to satisfy specific robustness in a case where the adversarial training is used.

In order to solve this problem, for example, an information processing apparatus of the present invention has the following configuration. That is, the information processing apparatus includes:
one or more processors; and
a memory including one or more programs,
in which when the one or more programs are executed by the one or more processors, the one or more programs cause the information processing apparatus to execute:
acquiring a user setting related to a feature of adversarial training;
by using the user setting, performing the adversarial training that trains a neural network by using training data including an adversarial sample and correct answer data indicating an original classification class, the adversarial training training the neural network that outputs a misclassification class in a case where the adversarial sample is input so as to output the original classification class in a case where the adversarial sample is input; and
by executing a format validation algorithm, determining that the adversarial sample does not exist within a predetermined range of noise of specific data in the neural network using a weighting factor obtained by the adversarial training.

According to the present invention, it is possible to generate the deep neural network capable of being predicted to satisfy the specific robustness in a case where the adversarial training is used.

BRIEF DESCRIPTION OF THE DRAWINGS

FIG. 12 is a diagram illustrating an example of a data structure of adversarial sample data; and FIG. 13 is a diagram illustrating an example of a data structure of model data.

DETAILED DESCRIPTION

Figure 1:
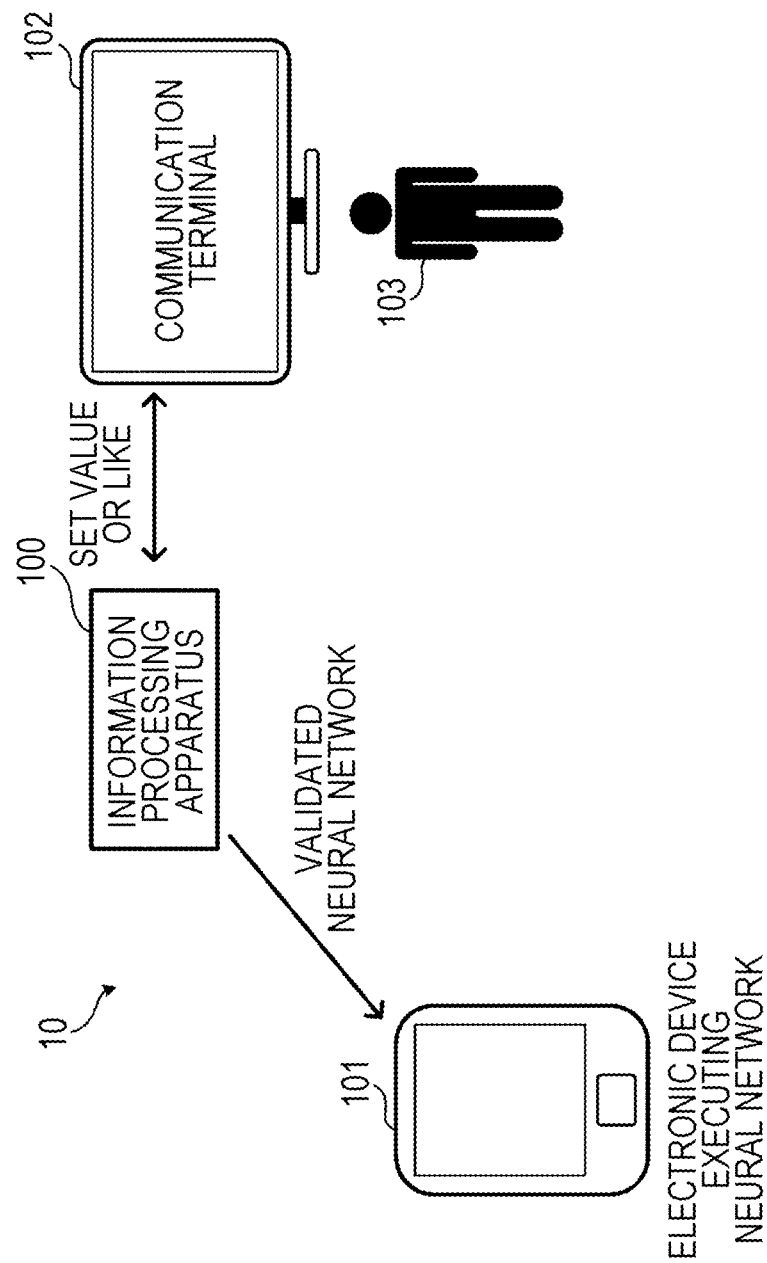
FIG. 1 is a view describing an outline of an information processing system according to an embodiment of the present invention.

An embodiment will be described in detail below with reference to the accompanying drawings. Note that the following embodiment does not limit the invention according to the claims, and all combinations of features described in the embodiment are not necessarily essential to the invention. Two or more features of the plurality of features described in the embodiment may be discretionarily combined. Furthermore, the same or similar configurations are denoted by the same reference numerals, and redundant description will be omitted.

<Outline of Information Processing System>

An example of an information processing system 10 according to the embodiment will be described with reference to FIG. 1. The information processing system 10 includes, for example, an information processing apparatus 100, an electronic device 101, and a communication terminal 102, which can communicate with each other via a network. The information processing apparatus 100 executes robustness improvement processing to generate a trained model (also referred to as a validated deep neural network) that has been subjected to adversarial training and format validation. The robustness improvement processing, the adversarial training, and the format validation will be described later. The information processing apparatus 100 is, for example, a server apparatus, but may be an edge node disposed on a network or a node constituting a P2P network. In the embodiment, a case where the server apparatus is configured by one computer will be described as an example for simplicity of description, but the server apparatus may be configured by a plurality of computers or may be embodied by a virtual machine operating on a host.

The communication terminal 102 is a communication terminal with which a user 103 specifies data or a set value necessary for the robustness improvement processing, or the user 103 uploads the necessary data to the information processing apparatus 100. The communication terminal 102 is, for example, a personal computer, but may be a tablet or a smartphone.

The electronic device 101 is an electronic device in which a validated neural network generated by the robustness improvement processing is disposed. For example, the electronic device 101 may download the validated neural network from the information processing apparatus 100 in response to an instruction of the user or in response to occurrence of a specific trigger such as a system update. In the example illustrated in FIG. 1, a case where the electronic device 101 is, for example, a mobile device is illustrated as an example, but the electronic device may be another electronic device that performs image recognition processing. The electronic device may be, for example, a vehicle or the like. Here, a configuration of downloading to the electronic device 101 has been described. However, instead of the electronic device 101, a web application server incorporating a neural network may be used, or the information processing apparatus 100 may be constructed on a platform of a cloud service, and the neural network may be incorporated in the information processing apparatus 100 itself or another apparatus on the platform of the cloud service.

Although details will be described later, the adversarial training and the format validation for the neural network are performed by performing the robustness improvement processing according to the embodiment. Therefore, in the neural network that has been subjected to the robustness improvement processing, the robustness against the adversarial sample is improved. The adversarial sample is a sample (input data) that is generated such that the neural network causes misclassification by adding noise with a level that is not noticed by human eyes (also referred to as perturbation). The neural network that has improved robustness against the adversarial sample can reduce a security risk due to the misclassification in an example of the following use case.

For example, a neural network that classifies what an animal included in an image is when an image obtained by capturing an animal is input will be described as an example. For example, when an image of a panda is input, the neural network outputs a classification result that the subject is the panda. For example, an image obtained by adding mathematically calculated noise (perturbation) to the image of the panda is generated as an adversarial sample. This adversarial sample (image of a panda with added noise) is seen as an image of a panda when seen with human eyes. However, when the adversarial sample is input to a neural network that is not subjected to adversarial training, the neural network outputs an incorrect classification result such as a gibbon. On the other hand, in the electronic device using the validated neural network that has been subjected to the robustness improvement processing according to the embodiment, it is possible to obtain a correct classification result (that is, a panda) for an adversarial sample with noise in a range satisfying the robustness requirement.

As another example, a neural network that classifies who a person included in an image is when an image obtained by capturing a face of the person is input will be described as an example. Such a face recognition technique is useful, for example, in entering and leaving a room or analyzing a monitoring image. When the face recognition processing using the neural network without the adversarial training is performed on a state (that is, the adversarial sample) of a person wearing the sunglasses, the state having a pattern with noise added, the neural network recognizes the person as another person. On the other hand, in the electronic device using the validated neural network that has been subjected to the robustness improvement processing according to the embodiment, for an adversarial sample with noise in a range satisfying the robustness requirement, it is possible to obtain a correct person as the classification result. That is, it is possible to prevent malfunction of the electronic device (spoofing by the adversarial sample).

As another example, with respect to a face image (or a moving image) of a person who does not exist in the world, the image being generated by a deep fake technique, a neural network that classifies whether or not the image is an image generated by the deep fake technique will be described as an example. Such a classifier is useful for determining a certificate photo or an image for an account generated by the deep fake technique, or determining a moving image generated for manipulation of political opinion. In a case where the neural network determination is avoided by the adversarial sample, there is a security risk. On the other hand, in the electronic device using the validated neural network that has been subjected to the robustness improvement processing according to the embodiment, for an adversarial sample with noise in a range satisfying the robustness requirement, it is possible to obtain a correct determination result of whether or not it is deep fake.

As still another example, a neural network that recognizes a legal limit speed from a speed sign in an image will be described as an example. In this example, the neural network may be installed in a vehicle. Such a neural network recognizes the legal limit speed from the speed sign in the image and enables the traveling vehicle to travel at the legal limit speed. In the case of performing adversarial sampling by adding a pattern to the sign, when recognition processing is performed by a neural network without adversarial training, there is a case where the sign is erroneously classified as a sign with a different speed or stop. On the other hand, in the electronic device using the validated neural network that has been subjected to the robustness improvement processing according to the embodiment, for an adversarial sample with noise in a range satisfying the robustness requirement, it is possible to obtain a correct classification result for the sign.

There are various cases of being capable of applying the electronic device using the validated neural network according to the embodiment to a real application. However, the case and effect of being capable of applying the validated neural network according to the embodiment to the real application are not limited to the example described above.
<Hardware Configuration Example of Information Processing Apparatus>

Figure 2:
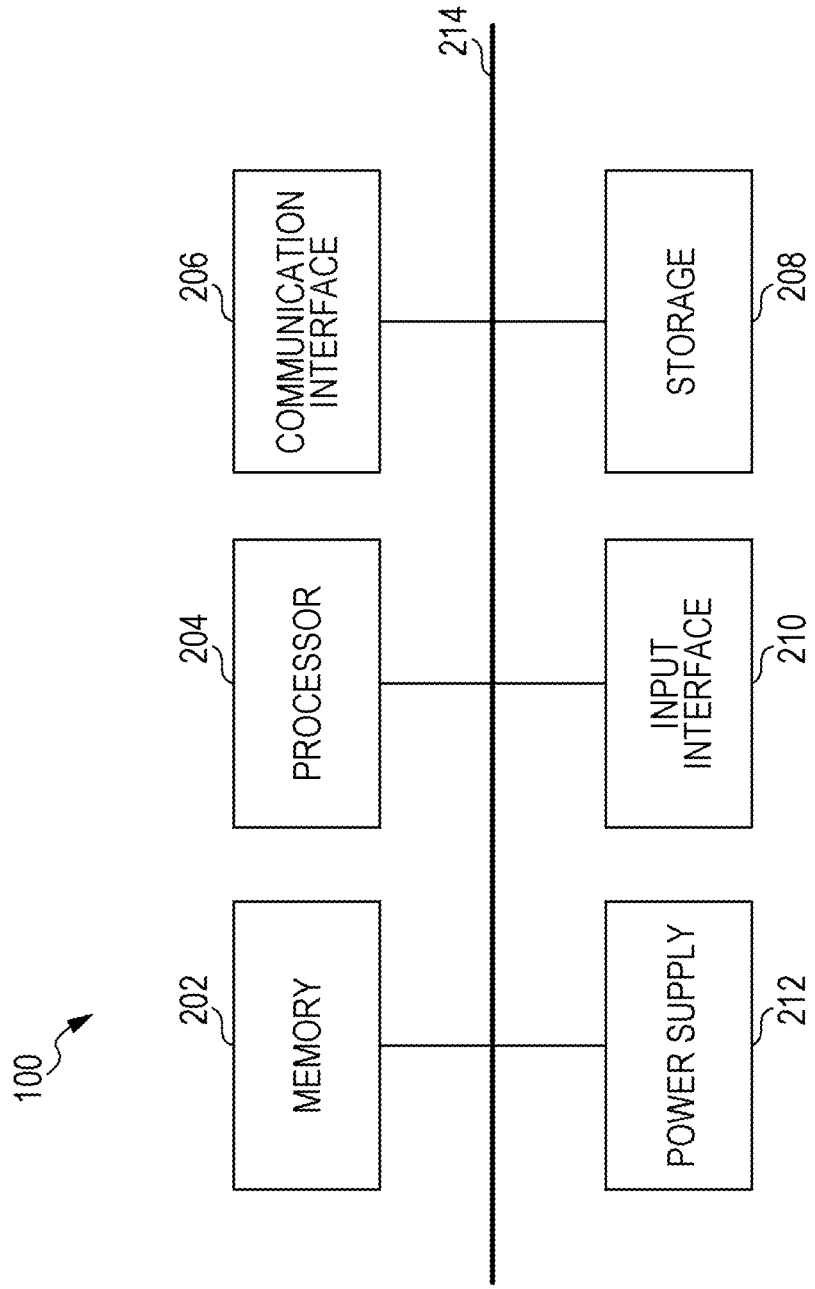
FIG. 2 is a block diagram illustrating a hardware configuration example of an information processing apparatus according to the embodiment.

The hardware configuration example of the information processing apparatus 100 will be described with reference to FIG. 2. The information processing apparatus 100 includes a memory 202, a processor 204, a communication interface 206, a storage 208, and an input interface 210. These elements are each connected to a bus 214 and communicate with one another via a bus 370.

The memory 202 is a volatile storage medium such as a DRAM, and temporarily stores data and a program. Furthermore, the storage 208 is a non-volatile storage medium that permanently stores data and a program. The storage 208 may be, for example, a semiconductor memory or a hard disk. The storage 208 can store various data necessary for execution of the adversarial training and the format validation, such as training data for training a neural network to be described later, test data for testing a trained neural network, and adversarial sample data.

The processor 204 includes, for example, an arithmetic circuit such as a central processing unit (CPU). The processor 204 may be configured by one or more processors. The processor 204 may further include an arithmetic circuit (for example, a GPU) or dedicated hardware for executing statistical processing such as machine learning at a higher speed, or may include a memory therein. The processor 204 deploys a program stored in the storage 208 to the memory 202 and executes the program to implement various functions of the information processing apparatus 100.

The communication interface 206 is an interface for transmitting and receiving data to and from the outside of the information processing apparatus 100. The communication interface 206 may include a communication circuit capable of communicating by a communication method complying with various standards. The communication interface 206 is connected to a network and exchanges data with the communication terminal 102 and the electronic device 101 via the network. The input interface 210 is, for example, a device for receiving an input from an administrator of the information processing apparatus 100, but may not be provided.

A power supply 212 is a circuit or a module for providing power for operating each unit of the information processing apparatus 100. The power supply 212 may be configured to include a battery.
<Description of Adversarial Training>

Before describing a functional configuration example of the information processing apparatus, the adversarial training according to the embodiment will be described. As described above, the adversarial sample is an image or a moving image to which noise is added so as to cause the neural network before performing the adversarial training to output a misclassification class instead of the original classification class. The robustness against the adversarial sample may be defined by at least how much noise needs to be added to change the classification result of the neural network by using specific data. Note that the magnitude of the noise to be added is also referred to as a norm. For the original sample, the greater the noise required to make it an adversarial sample is, the more difficult it is to deceive humans. For example, in a case where an original sample X is disposed in a two-dimensional space, the magnitude of the noise (that is, the norm) can be represented by a radius from X. That is, in a case where how great a norm is allowed is determined by a user setting or the like, it can be said that the robustness of a model is so high that the classification result for each sample in a specific data group (for example, training data) does not change within the range of the norm.

Although there are several methods for increasing the robustness against the adversarial sample, in the embodiment, the case of performing the adversarial training as one method for increasing the robustness will be described as an example. The adversarial training is training using the adversarial sample as training data. At this time, each correct answer data in the training data indicates an original correct answer class before being subjected to the adversarial sampling, not the class to which the adversarial sample is erroneously classified. That is, when the adversarial sample is input, the neural network is trained so as not to perform misclassification (that is, to classify into the original correct answer class).

Figure 4:
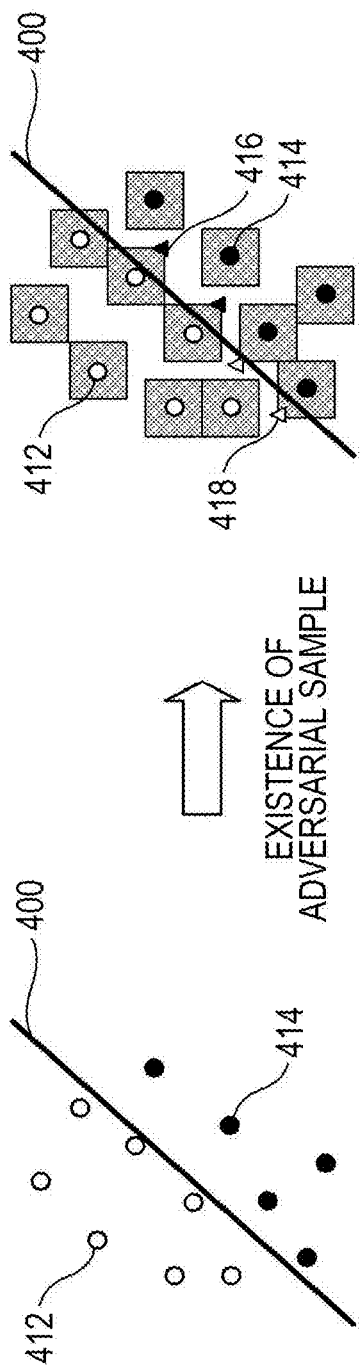
FIG. 4 is a diagram (1) for explaining a difference between sample classification by normal training and sample classification by adversarial training.
Figure 5:
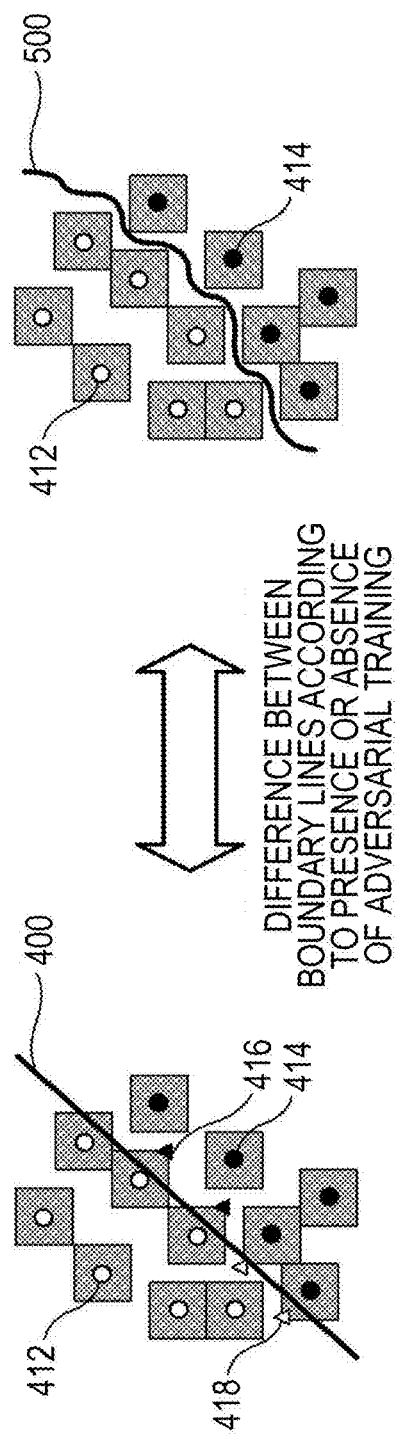
FIG. 5 is a diagram (2) for explaining a difference between sample classification by normal training and sample classification by adversarial training.

FIGS. 4 and 5 schematically illustrate a difference between sample classification by normal training and sample classification by adversarial training. On the right and left sides of FIG. 4, a boundary line 400 schematically illustrates boundary lines in a case where original training data is correctly classified by the neural network before performing the adversarial training. Since each sample is not subjected to the adversarial sampling, the neural network can correctly classify each sample.

The right side of FIG. 4 schematically illustrates that misclassification occurs in a case where the adversarial sample exists within a certain range of the norm from each sample. A square surrounding each sample illustrated on the right side of FIG. 4 schematically represents a region within a certain norm from each original training data (black circle 412 and white circle 414). Furthermore, a black triangle 416 and a white triangle 418 indicate adversarial samples that cause misclassification. In the diagram on the right side of FIG. 4, since the range of the norm in some samples falls on a region of another class (exceeds the boundary line 400), the adversarial samples (the black triangle 416 and the white triangle 418) exist in a "region within a certain norm from the original training data".

FIG. 5 schematically illustrates a difference between the boundary line 400 formed by learning the original sample and a boundary line 500 formed by the adversarial training. The left side of FIG. 5 illustrates a state in which the adversarial sample illustrated on the right side of FIG. 4 exists. In the adversarial training, a boundary for classifying the sample becomes like the boundary line 500 by learning with the adversarial sample such that the adversarial sample does not exist in a "region within a certain norm from the original training data". According to this, since the "region within a certain norm from the original training data" does not exceed the boundary line 500, the adversarial sample does not exist.

Note that the "region within a certain norm from the original training data" illustrated in FIGS. 4 and 5 corresponds to the magnitude of noise in a range satisfying the robustness requirement. That is, in generating a neural network subjected to the adversarial training, it is necessary to set in advance a robustness requirement, that is, to what extent of the norm robustness is provided, and then perform training with the adversarial sample of the norm.

Note that it is desirable to ensure that the adversarial sample does not exist in a region within a certain norm from the training data, but it is not necessarily ensured that the learning is performed in such a manner. Furthermore, the neural network generated by the adversarial training is not ensured to always output a correct classification result even when it becomes possible to obtain a high accuracy with a data sample used for training and testing, unlike training of a general deep neural network. On the other hand, misclassification for the adversarial sample may have severe result. Therefore, in the embodiment, by performing format validation to be described below, it is possible to predict how much robustness the neural network trained by the adversarial training satisfies.

<Description of Format Validation>

Next, validation of the deep neural network using the format validation according to the embodiment will be described with reference to FIGS. 6 to 9. The format validation ensures that the system is correct by mathematically proving whether or not hardware and software satisfy specific properties. In the validation of the embodiment, whether or not the deep neural network satisfies specific properties is proved by the format validation.

Figure 6:
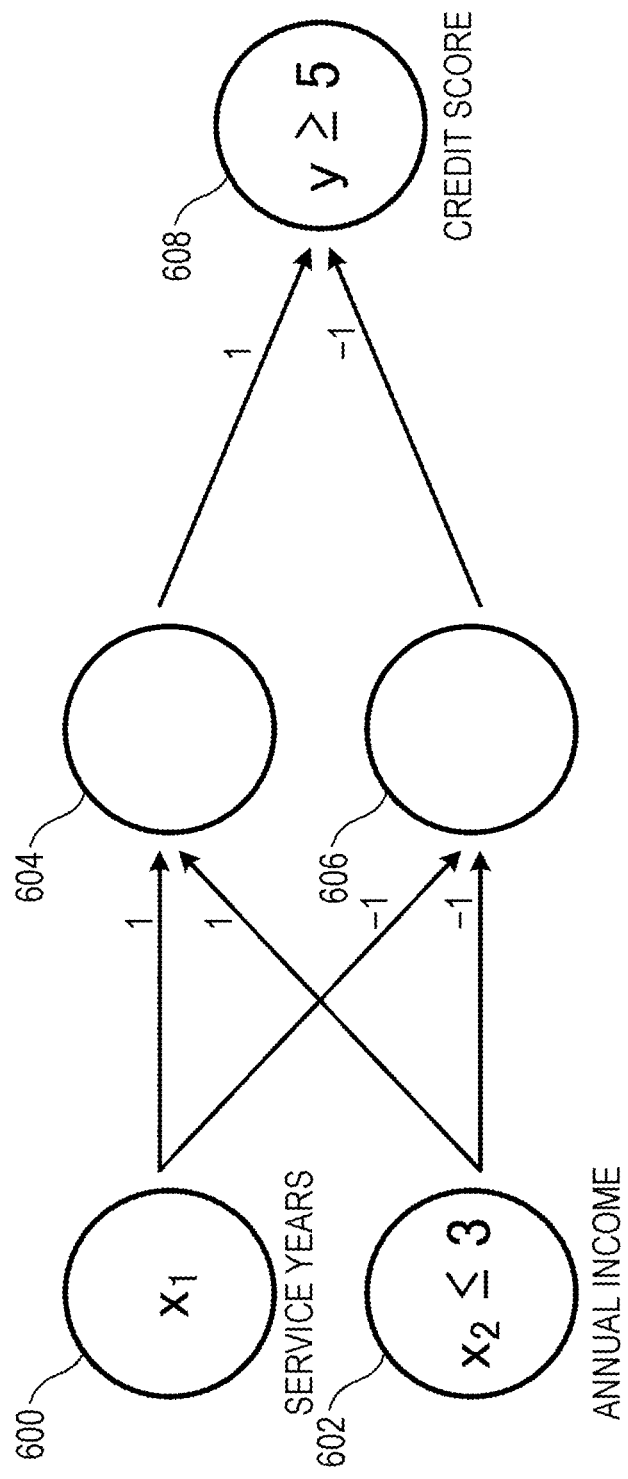
FIG. 6 is an example (1) for explaining a case where format validation is applied to a regression model.

FIG. 6 is an example for explaining a case where the format validation is applied to a regression model. In the example illustrated in FIG. 6, nodes 600 and 602 indicate neurons of an input layer. Furthermore, nodes 604 and 606 indicate neurons of an intermediate layer. Moreover, a node 608 indicates a neuron of an output layer. In the example of the regression model, the output layer outputs a prediction value (here, a credit score) corresponding to an input value. Furthermore, a numerical value associated with an arrow between the nodes indicates a value of a weighting factor connecting the nodes. Note that in this example, for simplification, a bias as zero is omitted. In the example illustrated in FIG. 6, it is validated whether there is a combination of inputs $(x_1, x_2)$ in which the output (prediction result) is 5 or greater in a constraint that an input $x_2$ is 3 or less. In this example, it is validated whether there is a set of a parameter indicating service years and a parameter indicating annual income, the set in which the credit score is 5 or greater.

Figure 7:
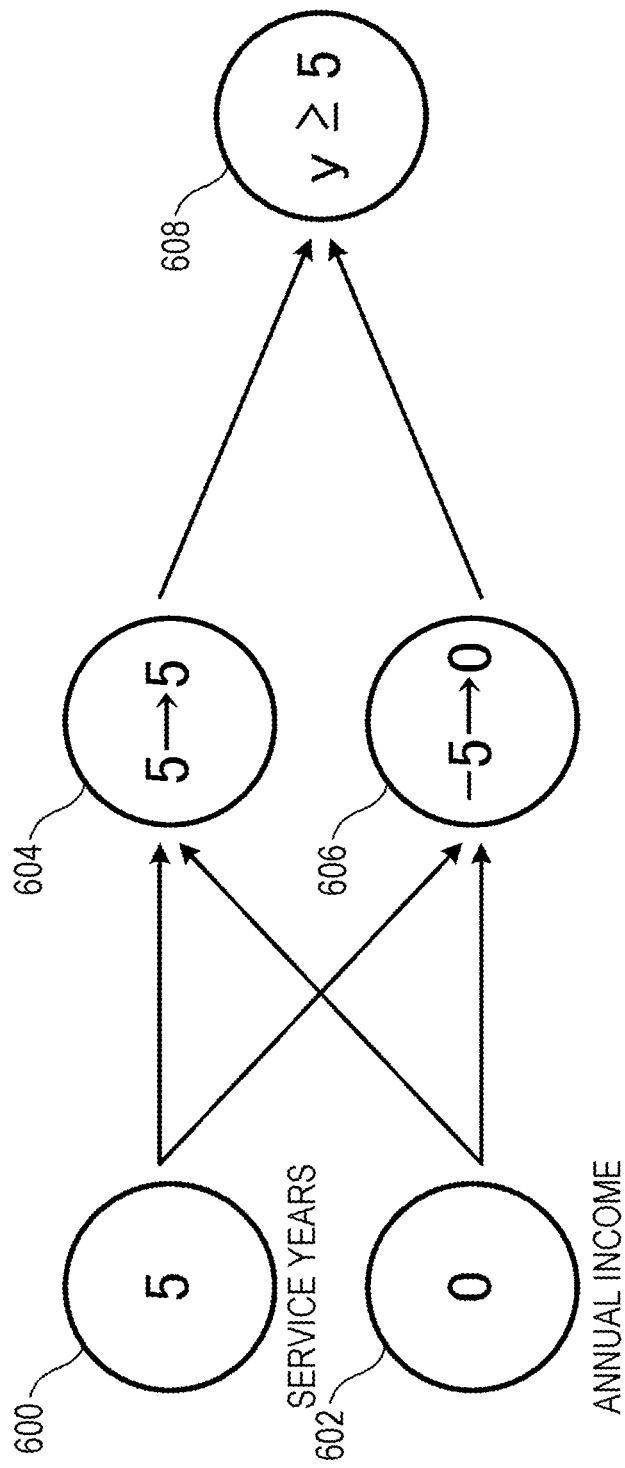
FIG. 7 is an example (2) for explaining a case where format validation is applied to a regression model.

FIG. 7 illustrates an example of a case where there is a solution satisfying the above-described constraint. In a case where the set of $(x_1, x_2)$ is $(5, 0)$, the sum of products of the input value and the weighting factor is calculated for each node, the calculation result is calculated by an activation function (for example, ReLU) of the intermediate layer, and thus a credit score of 5 is obtained.

Figure 8:
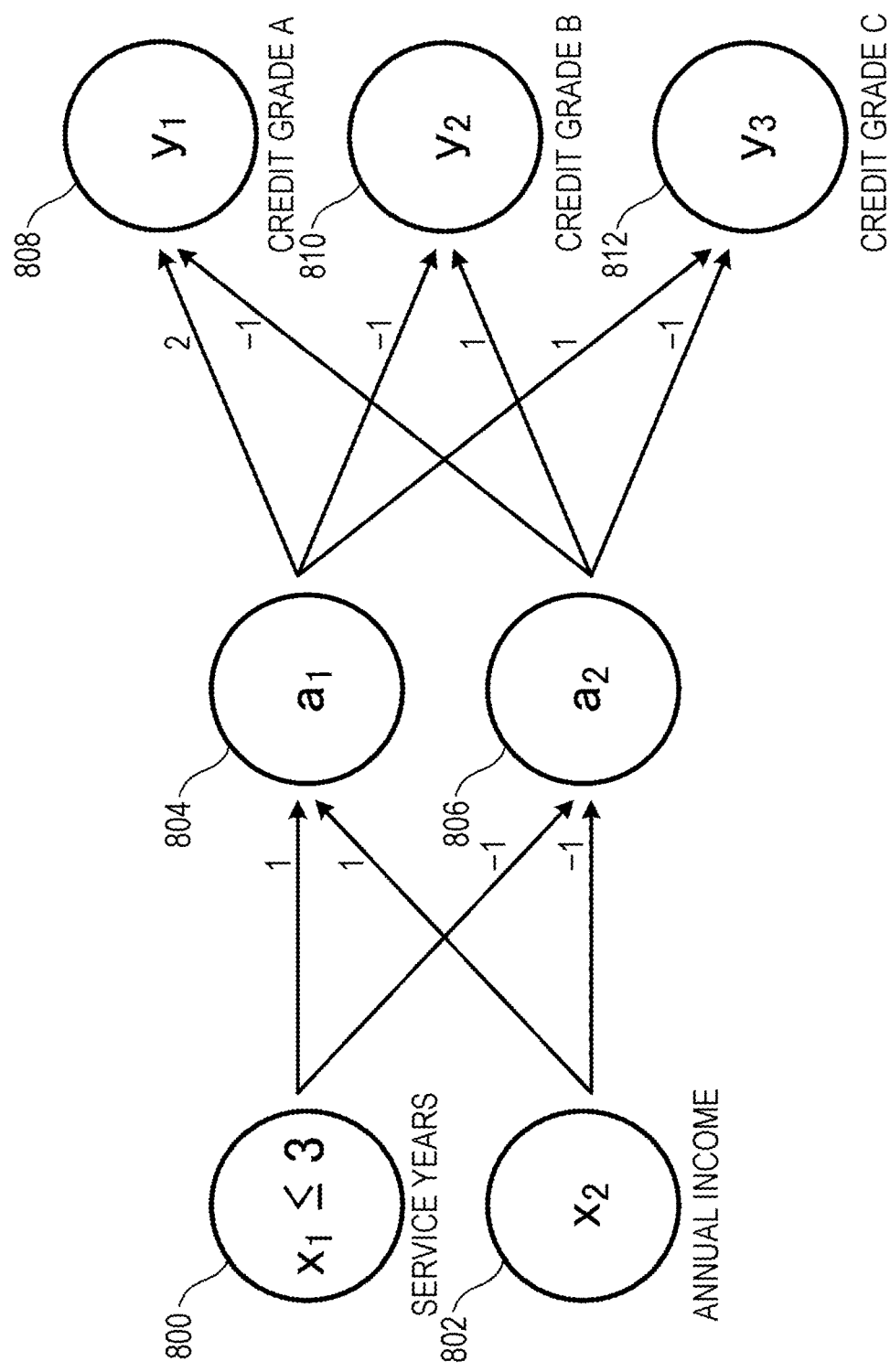
FIG. 8 is an example (1) for explaining a case where format validation is applied to a classification model.

FIG. 8 is an example for explaining a case where the format validation is applied to a classification model. In the example illustrated in FIG. 8, nodes 800 and 802 indicate neurons of an input layer. Furthermore, nodes 804 and 806 indicate neurons of an intermediate layer. Moreover, nodes 808, 810, and 812 indicate neurons of an output layer. In the example of the classification model, the output layer outputs a class (here, a credit grade) into which the input value is classified. A numerical value associated with an arrow between the nodes indicates a value of a weighting factor connecting the nodes. Also in this example, the bias as zero is omitted. In the example illustrated in FIG. 8, it is validated whether there is a combination of inputs $(x_1, x_2)$ in which a value of the node 808 of the output layer is maximized in a constraint that an input $x_1$ is 3 or less. In this example, it is validated whether there is a set of a parameter indicating service years and a parameter indicating annual income, the set in which a probability of a credit grade A is the highest.

Figure 9:
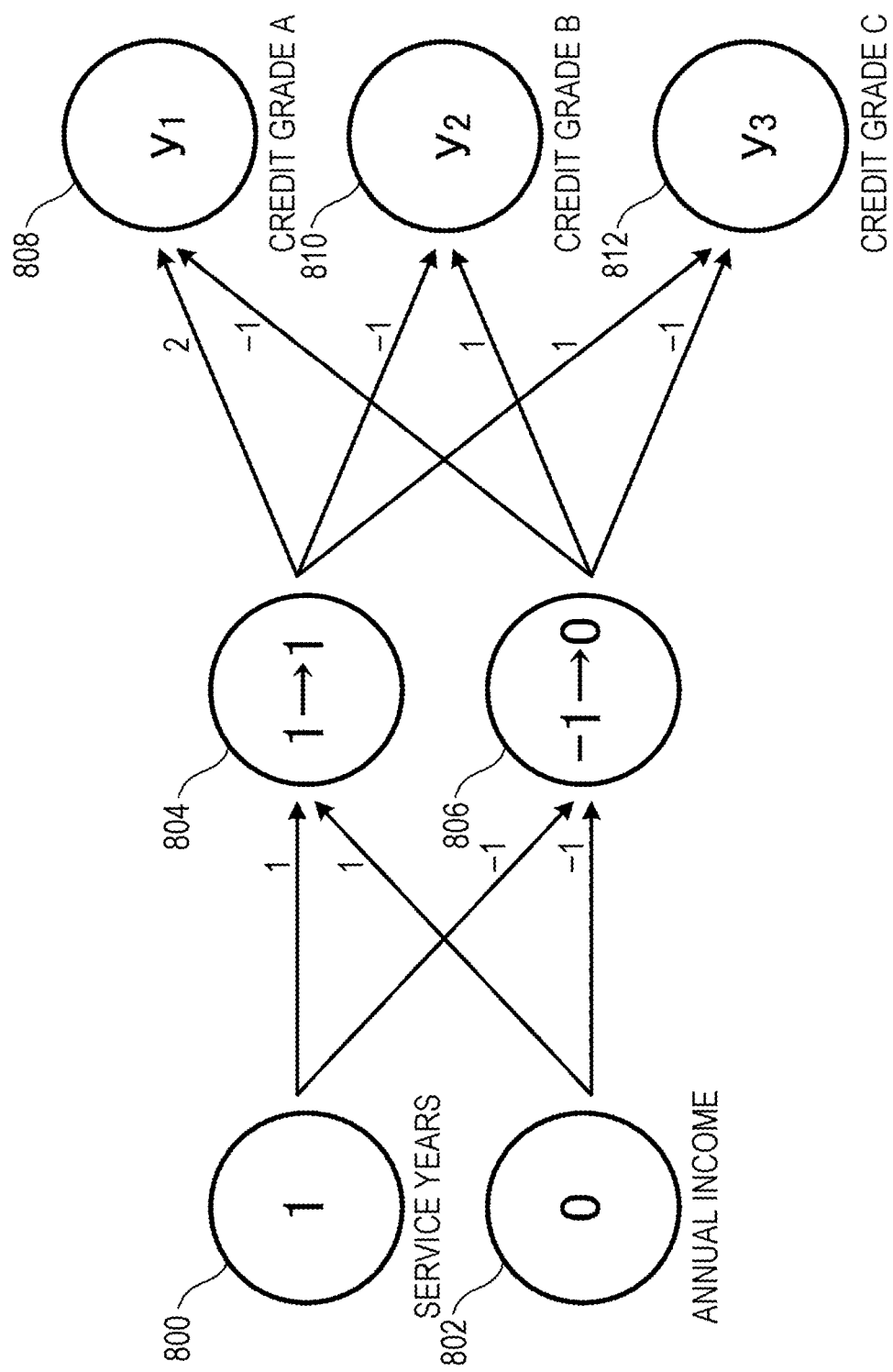
FIG. 9 is an example (2) for explaining a case where format validation is applied to a classification model.

FIG. 9 illustrates an example of a case where there is a solution satisfying the above-described constraint. In a case where the set of $(x_1, x_2)$ is $(1, 0)$, the sum of products of the input value and the weighting factor is calculated for each node, the calculation result is calculated by an activation function (for example, ReLU) of the intermediate layer, and thus a credit grade A becomes the highest.

As can be grasped from the above example, it is possible to ensure the robustness of the neural network generated by the adversarial training by using the absence of the adversarial sample within the certain norm of the specific data as a property and proving the property. For example, the weighting factor indicated as a classification model corresponds to a weighting factor obtained by the adversarial training, and the constraint in the input corresponds to a range of a norm of a specific sample. Furthermore, the classification of the output node corresponds to the output layer (classification result) of the neural network to which the adversarial training is applied, and the output constraint corresponds to that the probability other than the original classification class is not the highest. In this manner, by using the format validation, it is possible to be validated (determined) that the adversarial sample does not exist in the certain norm from the specific data in the neural network using the weighting factor obtained by the adversarial training.

<Functional Configuration Example of Information Processing Apparatus>

Figure 3:
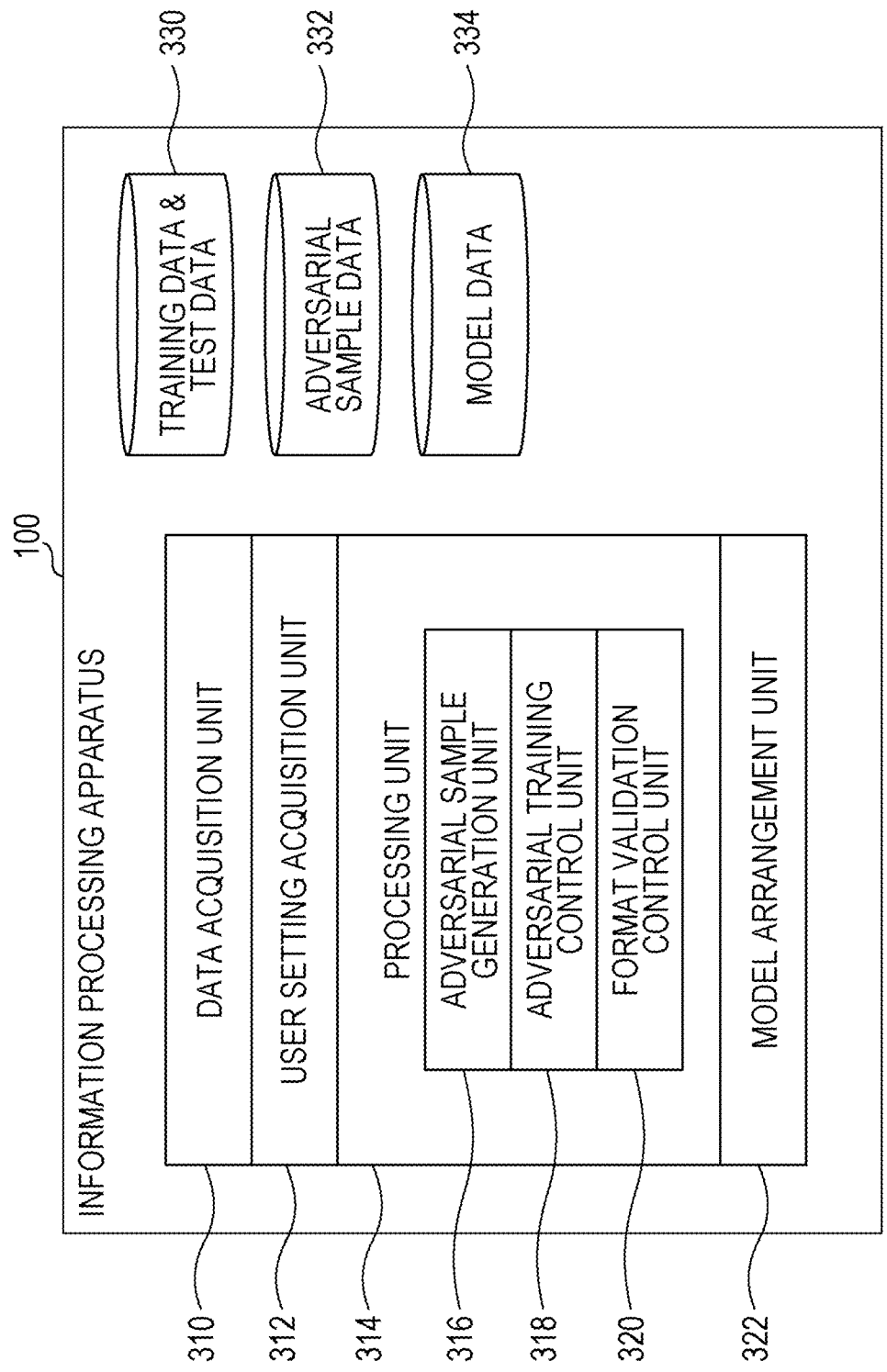
FIG. 3 is a block diagram illustrating a functional configuration example of the information processing apparatus according to the embodiment.

Next, the functional configuration example of the information processing apparatus 100 will be described with reference to FIG. 3. The functional configuration example illustrated in FIG. 3 can be realized, for example, by the processor 204 deploying one or more programs stored in the storage 208 to the memory 202 and executing the programs. Note that each of the functional blocks described in the embodiment may be integrated or separated, and the described function may be implemented by another block. Furthermore, what is described as hardware may be implemented by software, and vice versa.

A data acquisition unit 310 acquires, for example, data of a model to which the adversarial training is desired to be applied (hyperparameter regarding the configuration of the neural network), training data, and test data. For example, the data acquisition unit 310 may receive these data transmitted from the communication terminal 102, or may acquire data stored in the storage 208 in advance as training data, test data 330, and model data 334 in response to the user instruction. Moreover, these data stored in a storage outside the information processing apparatus 100 may be acquired in response to the user instruction.

A user setting acquisition unit 312 acquires, for example, a user setting related to a feature of the adversarial training from the communication terminal 102. The setting related to the feature of the adversarial training includes, for example, setting of a generation algorithm of the adversarial sample, setting of a norm (noise magnitude) set in the adversarial training, and setting of the number of epochs of training when executing the adversarial training.

The processing unit 314 controls each unit of the information processing apparatus 100 to control various operations of the information processing apparatus 100. Furthermore, the processing unit 314 controls the operations of an adversarial sample generation unit 316, an adversarial training control unit 318, and a format validation control unit 320 to implement robustness improvement processing.

The adversarial sample generation unit 316 performs adversarial sampling on the training data acquired by the data acquisition unit 310. Then, the adversarial sample generation unit 316 generates training data for adversarial training which is obtained by associating the generated adversarial sample with correct answer data indicating the original classification class. Furthermore, the adversarial sample generation unit 316 also performs adversarial sampling on the test data acquired by the data acquisition unit 310. Then, the adversarial sample generation unit 316 associates the data subjected to the adversarial sampling with the correct answer data of the test data as the test data used at the time of testing the neural network generated by the adversarial training. The adversarial sample generation unit 316 stores the generated training data and test data for adversarial training in the storage 208, for example, as adversarial sample data 332.

The adversarial training control unit 318 executes the adversarial training based on the training data for adversarial training generated by the adversarial sample generation unit 316, the user setting acquired by the user setting acquisition unit 312, and the model data. Furthermore, when the adversarial training ends at the time of reaching the set number of epochs and the set accuracy, the adversarial training control unit 318 evaluates that to what extent the trained neural network does not perform misclassification by using the test data for adversarial training. In a case where the result of the evaluation using the test data for adversarial training does not exceed a certain accuracy, the processing unit 314 may execute the adversarial training again and repeat the execution until the evaluation result using the test data for adversarial training exceeds the certain accuracy.

The format validation control unit 320 validates (determines) that the adversarial sample does not exist in a certain norm from the specific data in the neural network using the weighting factor obtained by the adversarial training of the adversarial training control unit 318. At this time, the format validation control unit 320 performs validation by using training data or test data which is not subjected to the adversarial sampling. The processing unit 314 may end the format validation processing in a case where a ratio of data satisfying the constraint of robustness is greater than a value set in advance, and perform adversarial training with a changed condition in a case where the ratio is not greater than the value set in advance. The format validation control unit 320 may label the data of the model for which the format validation has been completed, and store the data as the model data 334 in the storage 208.

In response to a request from the electronic device 101 or in response to an operation of the administrator of the information processing apparatus 100, a model arrangement unit 322 transmits the data of the model for which the format validation has been completed to the electronic device 101, and causes the model data to be deployed to electronic data.

Figure 11:
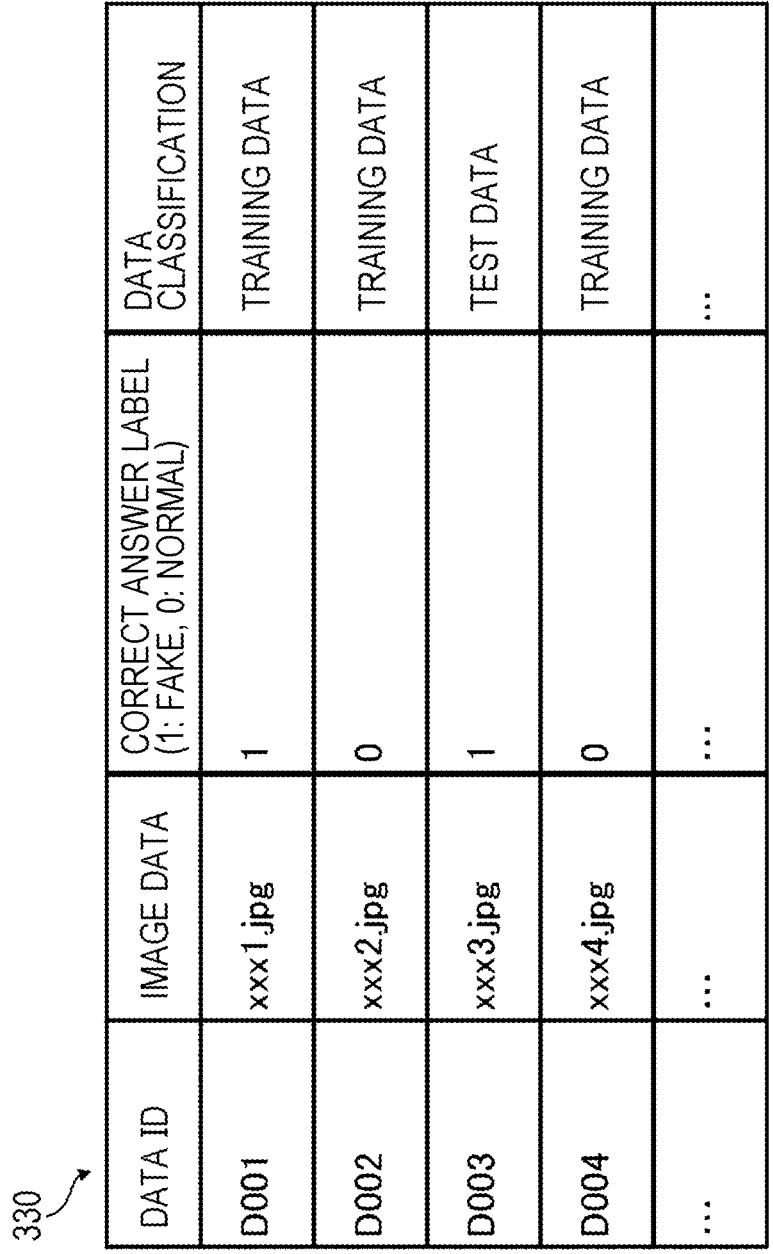
FIG. 11 is a diagram illustrating an example of a data structure of training data and test data.

The training data and the test data 330 include training data including original correct answer data and original test data. FIG. 11 illustrates an example of a data structure of the training data and the test data 330. The training data and the test data 330 include a data ID, image data, a correct answer label, and a data type. The data ID indicates an identifier of data. The image data is image data of the training data and the test data. In the example of FIG. 11, these image data are, for example, image data of either a face image of a non-existent person which is generated using a deep fake technique or a face image of a real person. This correct answer label corresponds to the original correct answer data. For example, "1" is indicated when the image data is an image generated by the deep fake technique, and "0" is indicated when the image data is a face image of a real person. As will be apparent to those skilled in the art, in a case where the neural network identifies a person name, the correct answer label is a name or the like corresponding to the image data. The correct answer label may be described in the form of One-Hot encoding independent of this data structure. The data type indicates whether the image data is used as training data or test data. The data type may be randomly assigned or fixed at each time of training such that a ratio between the training data and the test data is constant. Furthermore, the test data and the training data may have a data structure without providing a data type column.

The adversarial sample data 332 includes training data and test data for adversarial training which is subjected to the adversarial sampling. FIG. 12 illustrates an example of a data structure of the adversarial sample data 332. The adversarial sample data 332 includes a data ID, image data, a correct answer label, a data type, a generation algorithm, and a norm. Note that, although not illustrated in FIG. 12, the data ID of original image data when the adversarial sample is generated may be further included. The data ID is an identifier of an image subjected to the adversarial sampling, and the image data is image data subjected to the adversarial sampling. The correct answer label indicates a value of the correct answer label of the original image data as it is. That is, the deep neural network is trained to derive the original correct answer label without misclassification even when the adversarial sample is input. The data type is similar to the training data and the test data 330. The generation algorithm indicates types of algorithms that generate adversarial samples. The types of algorithms may be various, and may be, for example, Fast Gradient Sign Method (FGSM), C&W Attack, Jacobian Saliency Map Attack (JSMA), Boundary Attack, and the like. The norm indicates the magnitude of noise applied in creating the adversarial sample. Note that, as the norm, for example, another index indicating the magnitude of noise of the adversarial sample, such as the Wasserstein distance, may be used.

The model data 334 includes data (hyperparameter related to the configuration of the neural network) of a model to which the adversarial training is desired to be applied, which is acquired in advance or transmitted from the communication terminal 102. Furthermore, data of a model subjected to the adversarial training generated by the adversarial training control unit 318 (hyperparameter related to the configuration of the neural network) and data of a weighting factor are included. Furthermore, the model data 334 may include data of labeled model for which the format validation by the format validation control unit 320 has been completed. FIG. 13 illustrates an example of a data structure of the model data 334. The model data 334 includes a model ID, a weighting factor, a hyperparameter, a generation date and time, and a generation stage. The model ID is an identifier for identifying the neural network. The weighting factor is a weighting factor obtained when the neural network is trained. The hyperparameter may include data such as the number of layers, the number of nodes in each layer, and a network structure (for example, CNN, kernel size, and the like). The generation date and time represents a date and time when the model is generated. The generation stage is, for example, information for identifying whether the model is a model for which the format validation has been completed, a model for which the adversarial training has been completed, or an original model.

<Series of Operations of Robustness Improvement Processing in Information Processing Apparatus>

Figure 10:
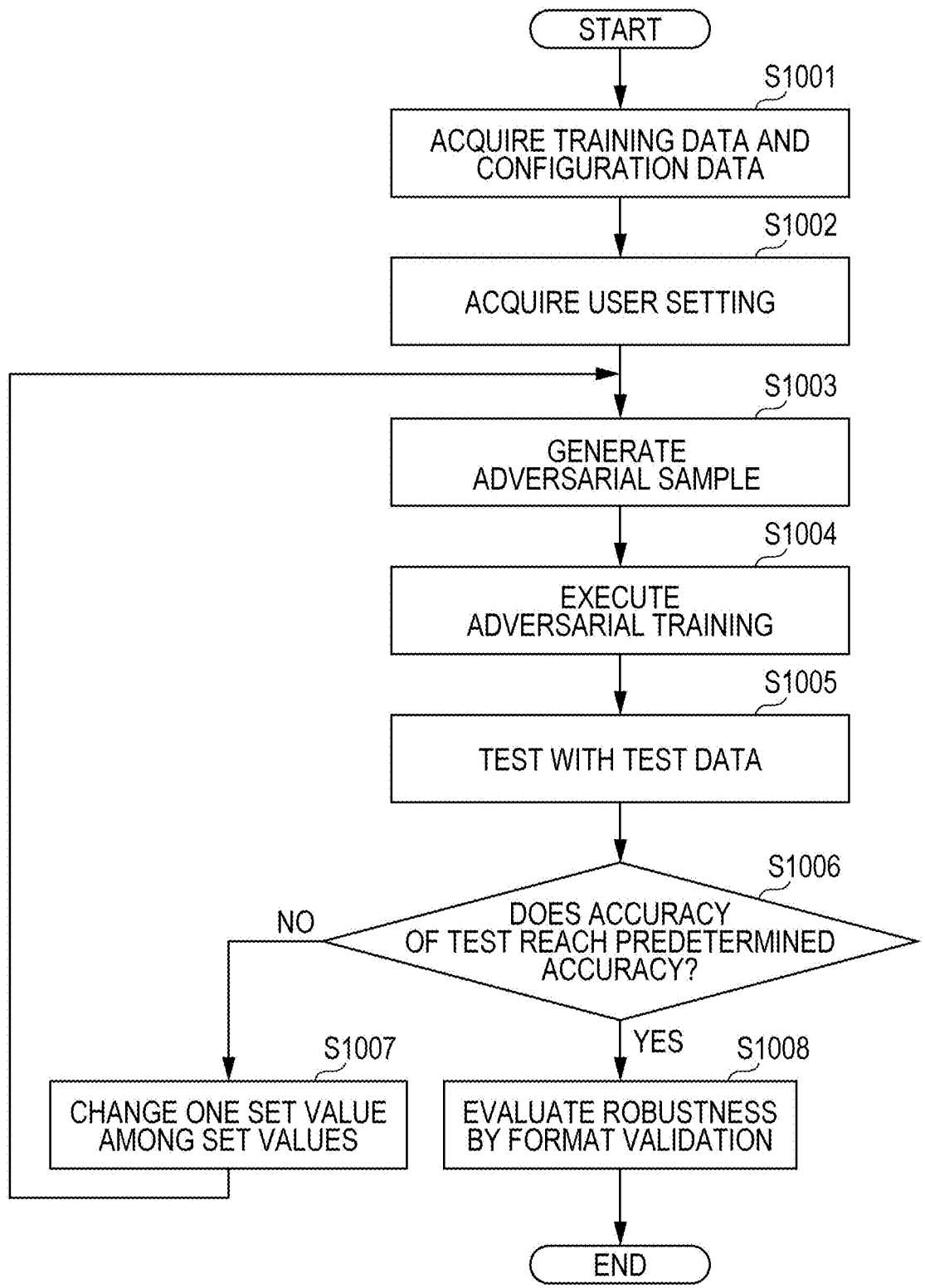
FIG. 10 is a flowchart illustrating an operation of robustness improvement processing in the information processing apparatus.

Next, a series of operations of the robustness improvement processing executed in the information processing apparatus 100 will be described with reference to FIG. 10. Furthermore, this processing is implemented by the processor 204 deploying a computer program stored in the storage 208 to the memory 202 and executing the program. In the following description, a processing subject of each step will be collectively described as the processor 204 for easy description, but each unit such as the processing unit 314 executes corresponding processing in accordance with processing contents.

First, the processor 204 acquires training data and a configuration of the neural network (hyperparameter or the like) (S1001), and then acquires user setting (S1002). Processing of S1001 and processing of S1002 may be reversed in sequence, or both data may be acquired at a time from the communication terminal 102. The user setting include a norm (magnitude of noise), an adversarial sample generation algorithm, the number of epochs when performing the adversarial training, a learning rate when performing adversarial training, a learning algorithm when performing the adversarial training, a threshold when evaluating test data for the adversarial training. The user setting may further include setting for specifying in a norm of which data the adversarial sample does not exist at the time of the format validation. The learning algorithm when executing the adversarial training includes specification of algorithms such as gradient descent, Adam, and the like.

Moreover, the processor 204 generates an adversarial sample (S1003). The generation of the adversarial sample is executed based on an adversarial sample generation algorithm included in the user setting. In a case where the algorithm is not specified in the user setting, an algorithm that can be taken as the adversarial sample generation algorithm may be sequentially executed to generate an adversarial sample generated by various algorithms. In this manner, adversarial training with improved robustness can be performed on various adversarial samples as well as adversarial samples with specific features.

The processor 204 executes adversarial training based on the training data acquired in S1001 and the user setting acquired in S1002 (S1004). The processor 204 executes the adversarial training for training a neural network by using training data including an adversarial sample and correct answer data indicating an original classification class. Note that the original neural network before performing the adversarial training outputs a misclassification class instead of the original classification class when the adversarial sample is input.

Next, the processor 204 tests the operation of the neural network generated by the adversarial training by using the test data acquired in S1001 (S1005), and determines whether accuracy obtained by the test is equal to or greater than a threshold (S1006). In a case where the accuracy is not equal to or greater than the threshold, the processor 204 advances the processing to S1007, changes one of the set values (S1007), and executes the processing of S1003 to S1005 again with the changed set value.

In S1007, the processor 204 changes one set value among the set values. For example, in a case where the test based on the test data fails without reaching a predetermined accuracy or greater in S1006, the magnitude of the norm (that is, one set value) may be reduced. Apart from this example, for example, only the accuracy for the test data of the adversarial training may be set as the user setting, and the magnitude of the norm (that is, one set value) may be changed from a small value to a large value each time S1007 is executed. In this manner, the magnitude of the norm can be gradually increased while the test result of the adversarial training exceeds the predetermined accuracy in the processing of S1003 to S1005. This can implement the adversarial training in which the norm is increased as much as possible (that is, the robustness is improved) while maintaining the accuracy of the deep neural network against the trade-off in which the accuracy decreases with respect to the original sample that is not the adversarial sample in a case where the robustness is improved by the adversarial training. In this case, in S1006, the processor 204 may determine whether the change of the norm has been repeated a predetermined number of times while maintaining a predetermined accuracy or greater, and in the case of YES, the processing may proceed to S1008. Note that, according to the above-described method, it is possible to implement the adversarial training of the maximum norm exceeding the predetermined accuracy in one adversarial sample generation algorithm, and it may be configured that the adversarial training of the maximum norm exceeding the predetermined accuracy is similarly performed in a plurality of other adversarial sample generation algorithms, and the user can select a desired deep neural network from among the deep neural networks generated by the adversarial training from the viewpoint of the accuracy or the feature of the adversarial sample generation algorithm.

In addition, the processor 204 may repeat the processing of S1003 to S1005 while changing one of the settings with other settings fixed among a plurality of the user settings. For example, by repeating the processing while changing the adversarial sample generation algorithm, the adversarial samples with various features are generated, and by performing the adversarial training on those adversarial samples, robustness of the generated deep neural network can be improved. Furthermore, it is often difficult to grasp which set value is selected to obtain the best result for the number of epochs when performing the adversarial training, the learning rate when performing the adversarial training, the learning algorithm when performing the adversarial training, and the like. Therefore, it is more advantageous for the user to specify a value with which the best result can be obtained from the result obtained when the processor gradually changes these set values other than setting by intuition or experience.

On the other hand, in a case where the accuracy is equal to or greater than a threshold, the processor 204 executes robustness evaluation by format validation (S1008). Note that the robustness evaluation by the format validation can be realized using a known technique. For example, it is possible to use a technique for proving a property for a deep neural network, which is described in a known document entitled "Reluplex: An Efficient SMT Solver for Verifying Deep Neural Networks" (Guy Kats and three others, May 19, 2017, URL: https://arxiv.org/pdf/1702.01135.pdf). For the deep neural network generated by the adversarial training, the processor 204 provides, as a query, a property in which the maximum output of the output layer is other than a class of the correct answer data within a predetermined norm (value of the norm specified by the adversarial training) of the original training data or the test data, and thus performs format validation on that there a combination of inputs corresponding to the property does not exist. In a case where the result that the combination of the inputs does not exist is obtained, the processor 204 proves that the adversarial sample does not exist within the predetermined range of noise of the specific data in the neural network using a weighting factor obtained by the adversarial training. In a case where the combination of inputs corresponding to the property is found, it is proved that the adversarial sample exists within the predetermined norm of the specific data. Note that in this case, a combination of the existing inputs is returned as a counter example. In the format validation, in a case where a data ratio to be robustness is greater than a value set in advance, the processor 204 determines that the adversarial sample does not exists within the predetermined range of the noise of the specific data, and ends the robustness improvement processing.

As described above, in the embodiment, after the user setting related to the feature of the adversarial training is acquired, the adversarial training for training the neural network is executed using the training data including the adversarial sample and the correct answer data indicating the original classification class and the user setting. Note that the neural network before performing the adversarial training outputs a misclassification class instead of the original classification class when the adversarial sample is input. It is determined that the adversarial sample does not exist within the predetermined range of the noise of the specific data in the neural network using a weighting factor obtained by the adversarial training by executing a format validation algorithm. According to this, it is possible to generate the deep neural network capable of being predicted to satisfy the specific robustness in a case where the adversarial training is used.

The invention is not limited to the above embodiment, and various modifications and changes can be made within the scope of the gist of the invention.

What is claimed is:

1. An information processing apparatus comprising:
one or more processors; and
a memory including one or more programs,
wherein when the one or more programs are executed by the one or more processors, the one or more programs cause the information processing apparatus to execute:
acquiring a user setting related to a feature of adversarial training, the user setting including a magnitude of noise of an adversarial sample and specification of learning algorithms when executing the adversarial training;
performing the adversarial training that trains a neural network by using training data including an adversarial sample and correct answer data indicating an original classification class, and the user setting, wherein the adversarial training trains the neural network that outputs a misclassification class in a case where the adversarial sample is input so as to output the original classification class in a case where the adversarial sample is input;
testing an operation of the neural network generated by the adversarial training using test data;
determining whether the neural network trained by the adversarial training satisfies a predetermined accuracy; and
executing robustness evaluation by format validation using a weighting factor obtained by the adversarial training,
wherein training the neural network and testing the operation of the neural network are repeated while (i) increasing the magnitude of the noise of the adversarial samples and setting an accuracy for the test data of the adversarial training and (ii) changing learning algorithm when executing the adversarial training, until the adversarial training satisfies the predetermined accuracy; and
in response to having determined that the neural network trained by the adversarial training satisfies the predetermined accuracy, the format validation is executed to determine that the adversarial sample does not exist within the predetermined range of the noise of the specific data in the neural network using the weighting factor obtained by the immediately previous adversarial training.

2. The information processing apparatus according to claim 1, wherein determining whether the neural network trained by the adversarial training satisfies the predetermined accuracy includes determining whether accuracy of a test using the neural network trained by the adversarial training and the test data exceeds a predetermined threshold.

3. The information processing apparatus according to claim 1, wherein the user setting includes a generation algorithm of the adversarial sample, and
the one or more processors execute the adversarial training while changing the generation algorithm of the adversarial sample.

* * * * *